Aug. 21, 1923.
C. MACBETH ET AL
1,465,609
CONVEYER FOR VULCANIZING PRESSES
Filed March 24, 1919
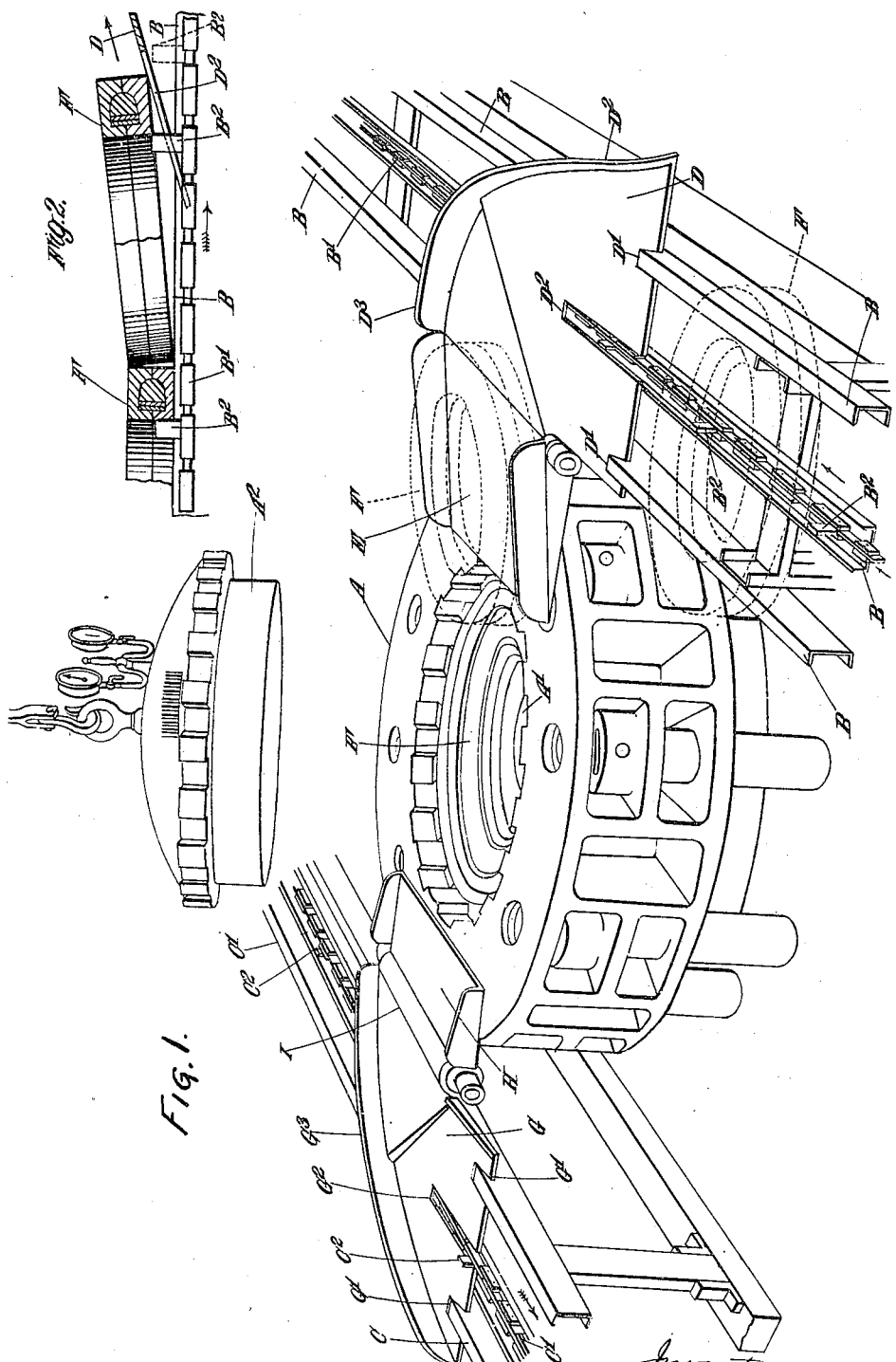

Patented Aug. 21, 1923.

1,465,609

UNITED STATES PATENT OFFICE.

COLIN MACBETH AND HARRY WILLSHAW, OF BIRMINGHAM, ENGLAND, ASSIGNORS TO THE DUNLOP RUBBER COMPANY, LIMITED, OF WESTMINSTER, LONDON, ENGLAND.

CONVEYER FOR VULCANIZING PRESSES.

Application filed March 24, 1919. Serial No. 284,825.

*To all whom it may concern:*

Be it known that we, COLIN MACBETH and HARRY WILLSHAW, both subjects of the King of Great Britain, residing at Para Mills, Aston Cross, Birmingham, in the county of Warwick, England, have invented certain new and useful Conveyers for Vulcanizing Presses, of which the following is a specification.

This invention relates to vulcanizing presses, the chief object being to enable tyre moulds or other circular or other shaped moulds for rubber goods to be supplied to or removed from a vulcanizing press by mechanical means so as to dispense with manual labour for lifting, lowering or carrying the moulds.

According to this invention we provide means whereby each mould can be moved along a track towards the press and at a certain point deflected or directed into the press thus enabling several moulds to be supplied in quick succession to the press in which they may be superimposed on the press ram. After vulcanization has been effected the superimposed moulds are raised by the press ram and as each mould reaches a position slightly above the level of the top of the press it is slid or moved horizontally and directed on to another track along which it can be moved away from the press to the required position. In this manner a continuous supply of moulds to and from the press can be readily and easily effected. The press may be disposed between two parallel tracks each comprising two rails for supporting the moulds and a moving chain or the like having lugs or projections which bear against the inner peripheral surfaces of the moulds and pull the latter in the required direction, the moving chains of the said tracks preferably travelling in opposite directions. At suitable points on the supply track adjacent to the press is provided the deflecting or directing device which may be in the form of a plate inclined upwardly in the direction of movement of the chain and having a slot through which the lugs or projections on the moving chain pass and move under the inclined plate so as to become gradually disengaged from the moulds as the lugs draw the latter upwardly on to the inclined plate. After a lug or projection on the chain has moved away from a mould, the forward movement of the mould up the inclined plate is continued by the next mould (which is being brought along by the chain) pushing against the first mould. The plate may be provided with a curved or suitably formed guiding flange for enabling the moulds as they are pushed upwardly on to the plate to be directed down a chute so that they slide successively into the press. At a certain position on the removing track a somewhat similar deflecting or directing device to that above described is provided which however may be associated with a directing or guiding plate (corresponding to the aforesaid chute) and a roller over which the moulds as they are moved from the press are guided or directed on to a plate disposed over the track and inclined downwardly in the direction of movement of the chain. This inclined plate may be provided with a curved or other suitably formed guiding flange which directs the moulds on to the removing track ready to be engaged by the lugs on the moving chain as the lugs travel under the plate and appear through a slot formed therein. Several vulcanizing presses may be arranged between the aforesaid tracks and the deflecting or directing means may be slidable along the said tracks into a position adjacent to any one of the presses in order that the moulds may be supplied to and removed from that particular press.

In order that the said invention may be clearly understood and readily carried into effect, the same will now be described more fully with reference to the accompanying diagrammatic drawings in which:—

Figure 1 illustrates one construction of a vulcanizing press and one arrangement of the supply and removal conveyers or tracks and the deflecting or directing devices.

Figure 2 is a side elevation partly in section showing how the moulds are pushed up the inclined deflecting plate on the supply conveyer or track.

A is the vulcanizing press which is provided with a circular opening A' into which the moulds are successively supplied so as to be superimposed upon a vertical movable ram within the aforesaid circular opening which latter is adapted to be closed when the required number of moulds has been supplied, by lowering a cover A² suspended by a hoisting arrangement above the aforesaid opening.

The supply track comprises two horizontal and parallel rails B B between which is adapted to travel just below the level of the rails and in the direction of the arrow, an endless chain B' having lugs or projections B² which project upwardly above the level of the rails B. As shown the chain is guided by a channel bar B³. The removal track also comprises rails C C and a moving chain C' with upwardly projecting lugs C², the chain C' being arranged to travel in the opposite direction to the chain B' as shown by the arrow. The two tracks are arranged parallel with each other close to the vulcanizing press which is located between the two tracks as shown in Figure 1. The movement of each chain may be effected by means of an electric motor which may be controlled by a suitable switch in such a manner as to vary the speed of the chain and to start or stop the movement as may be required, the movement and control of the chains being independent. Supported on the track rails B is a plate D which is notched at D' to fit over the rails B B so that its front edge is below the level of the rails; the plate D is inclined upwardly in the direction of movement of the chain B' and is provided with a slot D² which allows for the passage of the lugs B² on the chain B' so that as the chain moves forward the lugs B² enter the said slot D² and gradually pass below the plate D where it is raised a suitable distance from the rail B'. The plate D is provided with a curved upwardly directed flange D³ extending across the track rails B and at the edge of the plate parallel to the line of movement of the chain, a chute E is hinged which is downwardly inclined when resting on the top of the vulcanizing press as shown. The arrangement is such that the moulds F are supported on the aforesaid rails B and are each drawn along in the direction of the arrow by one of the lugs B² on the chain B' engaging with the inner peripheral surface of the mould. Several moulds may be placed one behind the other on the rails B and may be moved simultaneously by means of the lugs B² on the chain B'. When the first mould reaches the inclined plate the forward movement of the chain carries or pulls the mould partly on to the plate, see Figure 2, and as the forward movement of the chain continues the lug B² engaging with the inner peripheral surface of the mould gradually moves out of contact therewith and passes through the slot D² and under the plate leaving the mould partly supported on the plate. The next succeeding mould in being moved or drawn forward by a lug B² on the chain will bear against the preceding mould partly supported on the plate D and will push that mould upwardly and along the plate so that it is directed by the curved flange D³ and so long as this movement continues the mould will be guided from the plate D on to the downwardly inclined chute E down which it gravitates or slides into the press opening A' so as to be supported on the ram disposed therein. The second mould will be partly drawn on to the inclined plate D as above described and will be pushed forward and directed down the chute E into the press opening A' when the next succeeding mould bears against it and pushes the same in the forward direction. The successive moulds are moved forward in the manner aforesaid and the movement of the last mould on reaching the upwardly inclined plate D is continued by placing a bar or the like between it and the next succeeding lug on the chain so that it can be pushed upwardly on to the inclined plate D to engage with the guiding flange D³ which directs it on to the chute E down which it slides into the opening A' of the press.

As each mould is supplied in to the opening A' in the press, the ram is lowered to provide space for another mould, the several moulds thus being superimposed on the ram and when the desired number of moulds have been placed in the press the cover A² is lowered to close the press opening A' and vulcanization proceeds in the usual manner.

On the removal track is supported an inclined plate G somewhat similar to the plate D on the supply track, inasmuch that it is notched at G' to fit over the rails C C and is provided with a slot G² parallel to the chain C' and with a curved flange G³, this plate G however being inclined downwardly in the direction of movement of the chain. A hinged guide plate H resting on the press top is also associated with the plate G and a roller I is provided to facilitate the movement of the moulds as hereinafter described. After vulcanization the cover A² is raised and suspended as shown and the press ram with the superimposed moulds thereon is raised. As each of the moulds on the ram assumes a position slightly above the top of the press it is moved laterally on to the guide H by an operator with the aid of levers, or by power operated means and it can be easily pushed over the roller I on to the plate G, the flange G³ of which directs the mould so that it slides downward until it is partly supported on the plate G and on the rails C. One of the lugs C² on the moving chain C' will as it passes through the slot G² engage with the inner surface of the mould supported partly on track and will draw it completely off the plate G and along the track rails C to the required position ready for the next operation in the process of manufacture to be carried out. The various moulds on the press ram are successively dealt with and conveyed away as above described and in this manner the operation of emptying the press and carrying away the moulds is accomplished expeditiously without any considerable manual effort. Only one vulcanizing press is shown in the drawing but it will be understood that a number of such presses may be disposed at suitable distances apart between the supply and removal tracks and in such case, the deflecting or directing devices D and G with the chute E and guide plate H respectively may be slidable along the rails B and C to any particular press so that say after one press has been filled, the deflecting devices D and chute E can be shifted along the track rails B to the next press which is then filled as aforesaid and the directing device G with the guide plate H are shifted in the same way for enabling the emptying of each press and the carrying away of the moulds to be effected. For this purpose the moving chains and rails of the two conveyers or track are continuous to serve for the several presses employed.

What we claim and desire to secure by Letters Patent of the United States is:—

1. Apparatus for use in supplying moulds to a vulcanizing press, comprising a track along which the moulds are moved by a moving chain having lugs for engaging with the moulds and an inclined plate on said tracks having a slot therein through which the lugs on the chain pass during the movement of the chain.

2. Apparatus for use with a vulcanizing press comprising a supply track, a removal track, a chain for drawing moulds along each track, a deflecting plate on the supply track inclined upwardly in the direction of movement of the chain so that the moulds can be drawn on to and pushed upwardly on to the deflecting plate owing to the movement of the chain until they successively reach a position in which they slide into the press, the removal track having a deflecting plate inclined downwardly in the direction of movement of the chain to receive moulds removed from the press.

3. Apparatus for use with a vulcanizing press comprising two tracks, one for supplying moulds to the press and the other for removing them, a deflecting plate on the supply track up which the moulds are pushed by succeeding moulds, a chute attached to the deflecting plate for directing the moulds into the press, a deflecting plate on the other track, and a guide roller to facilitate movement of the moulds from the press to the second mentioned deflecting plate, and means for moving the moulds along the tracks, substantially as and for the purpose specified.

4. Apparatus for use with one or more vulcanizing presses comprising mould supplying and removing conveyers traveling in opposite directions and adapted to be arranged on opposite sides of the presses, a track cooperating with each conveyor, deflecting means for guiding moulds from the supply track into a press, and deflecting means for guiding the moulds from the press to the removing track, the said deflecting means being slidable along the tracks to assume a position adjacent to any one of the presses when more than one press is employed, substantially as described.

5. In an apparatus for the purpose described, the combination with a vulcanizing press, of means for supplying moulds to the press comprising a track extending past the press, means for moving moulds along the track, and a deflector positioned on the track opposite the press and including a section extending longitudinally of the track and inclined upward in the direction of the travel of the moulds, a lateral extension hinged to the inclined section and extending downward onto the press, and a curved guide extending upward from the inclined section and adapted to guide a mould onto said hinged section.

6. In an apparatus for the purpose described, the combination with a vulcanizing press, of means for supplying moulds to the press comprising a track extending past the press, a chain adapted to move a mould longitudinally of the track, and a deflector positioned on the track opposite the press and including a section extending longitudinally of the track, and inclined upward in the direction of the travel of the chain and laterally toward the press, and a section extending laterally from the aforesaid section toward the press.

7. In an apparatus for the purpose described, the combination with a vulcanizing press, of two tracks extending past the press, means associated with each track for engaging moulds supported thereon and moving them longitudinally of the track, a deflector positioned on one track in the path of travel of the moulds and having a section inclined upward in the direction of travel of the moulds and a lateral extension to deliver the moulds to the press, and a deflector on the other track opposite the press having a lateral extension adapted to receive moulds withdrawn from the press and a section inclined downward over its cooperating track in the direction of movement of the mould engaging means.

COLIN MACBETH.
HARRY WILLSHAW.